United States Patent Office.

JACOB REESE, OF PITTSBURG, PENNSYLVANIA.

PROCESS OF PRODUCING A METAL HIGH IN PHOSPHORUS AND CARBON AND LOW IN SILICON.

SPECIFICATION forming part of Letters Patent No. 302,158, dated July 15, 1884.

Application filed January 12, 1881. (No specimens.)

*To all whom it may concern:*

Be it known that I, JACOB REESE, a citizen of the United States, residing at Pittsburg, in the county of Allegheny and State of Pennsylvania, have invented certain new and useful Improvements in Processes of Producing Metal High in Carbon and Phosphorus and Low in Silicon, of which the following is a specification.

The object of my invention is to produce a metal especially adapted to the use of the basic dephosphorizing process.

Heretofore, for the use of the Bessemer process, it was desirable to secure a metal containing not less than two per cent. of silicon and not more than one-tenth of one per cent. of phosphorus. The silicon was relied upon as the main caloric-producing substance in the metal, and the presence of phosphorus in the metal was highly objectionable, as dephosphorization did not take place in the process; but at the present time the application of the basic improvement to the process has changed these requirements, and, establishing new conditions, it has directly reversed the order, and demands a metal high in phosphorus and low in silicon for its rapid and economical operation. This result is due to the fact that silicon in the metal is highly objectionable to its use in the new basic process; but, as a reduction of the silicon means an abstraction of a caloric-producing substance, the metal should be made to contain a larger percentage of other impurities to develop sufficient caloric to keep the metal highly fluid during its treatment in the basic process. In this process the carbon and silicon are first eliminated, and then the phosphorus; therefore the carbon should be high in a desiliconized metal to keep it fluid during the ordinary blow, and it should contain an increased amount of phosphorus to develop sufficient caloric to retain the metal in a highly fluid state during the afterblow. The reactions which take place in the basic process are, first, the carbon and silicon are oxidized, and then the phosphorus. The phosphorus is oxidized to phosphoric acid, ($P_2O_5$.) If oxide of iron is present, the phosphoric acid unites with it, forming a phosphate of iron ($2FeO, P_2O_5$.) If free silicic acid is present, it robs the phosphate of its iron, forming a silicate of iron, and the phosphorus drops back into the metal. If carbonic oxide is present, it robs the phosphoric acid of oxygen, reducing the phosphate to a phosphide, which returns to the metal. If silicic acid is present, it attacks the lime lining and wears it down rapidly, forming silicate of lime. Hence it will be seen that it is desirable to produce a metal low in silicon for the use of the basic process.

In producing metal it is desirable to run the blast-furnace at as high a temperature as possible, as a greatly-increased output is the result; but the chemical reactions of the blast-furnace tend to produce a metal high in silicon at a high and low in silicon at a low temperature. The limestone, coke, and iron ores which are used contain each varying amounts of silex, and the temperature of the furnace also varies; consequently it is a matter of great difficulty to produce a metal low in silicon—that is, a metal containing from three-quarters to one-half of one per cent. of silicon. In the practice of my invention, however, I am enabled to produce a metal containing a minimum and definite amount of silicon by working the furnace so as to produce the cheapest metal, no attention being paid to the silicon, except to have the smallest amount present consistent with the greatest economy of the blast-furnace practice, and then desiliconizing the metal without eliminating the carbon by subsequent treatment in an open hearth. It is desirable to retain the carbon in the metal, to serve as a caloric-producing agent when the metal is to be treated in the basic dephosphorizing process.

In the practice of the ordinary open-hearth process there are three distinct periods in which different chemical reactions take place. In the first or melting period about fifty per cent. of the silicon and carbon is eliminated in the melting of the metal. The second or desiliconizing period then commences, and the metal remains in a state of rest until the silicon is reduced down to the two one-hundredths of one per cent., at which point the carbon is attacked, and the third or boiling period commences and the carbon is rapidly eliminated.

In the use of my improvement it is purposed to work the blast-furnace so as to produce the cheapest quality of metal, and then run this molten metal into an open hearth and retain it there at a state of rest until the silicon is reduced down to about the two one-hundredths of one per cent., and then discontinue the treatment in the open hearth, thus dispensing with the first and third periods and retaining the carbon for the purpose hereinbefore set forth.

When metal is to be produced for the use of the basic process, I smelt iron ores with limestone and carbonaceous fuel, together with suitable quantities of phosphuretic basic slag to phosphorize the metal to the desired degree, in a blast-furnace. The amount of phosphuretic slag used should be sufficient to produce a metal containing a minimum of two per cent. of phosphorus. This silicious phosphuretic metal is then run into an ordinary silicious-lined open hearth, and preferably treated with oxide of iron—about from five to twenty per cent. of oxide to the weight of the metal; or the metal may be treated without the oxide; but in this case desiliconization will not be so rapidly effected. The amount of oxide will depend upon the amount of silicon present in the metal. This treatment should be continued until ebullition takes place and the metal boils, which is a positive and unerring indication that the silicon has been reduced down to the two one-hundredths of one per cent. of the weight of the metal. At this juncture the molten metal should be immediately withdrawn from the furnace; but if anything should prevent its removal or render it inexpedient at this point of time, then in such case a small amount of silicious pig metal should be added to raise the percentage of silicon and stop the ebullition until the silicon is again reduced down to the two one-hundredths of one per cent.

If it is found that dephosphorization takes place to any considerable extent in the open hearth, which will be the case if the bath or slag is highly basic, then, in such case, the metal should not be run out when the silicon is reduced down to two one-hundredths of one per cent., but the metal should be allowed to remain and boil for about ten to twenty minutes, which will leave but a trace of silicon, and the carbonic oxide evolved during this continuation of the treatment will decompose the phosphates in the slag and cause the phosphorus to drop back again into the metal.

By the means above specified I am enabled to produce a cast-iron containing from two to three per cent. of phosphorus and only the two-hundredths of one per cent. of silicon, and having about the same per cent. of carbon as the metal contained when run out of the blast-furnace. When the metal has been so produced, it should be run into a converter and treated by the basic process, and it will be found that the process will be expedited, and that the operation of dephosphorization will be more thorough and economical.

In describing my invention I have stated that the metal should be run direct from the blast-furnace into the open hearth, the object being to avoid the loss of carbon which would take place in remelting; but the metal may be run into pigs and afterward remelted and treated by the basic process; but in such a case it is difficult to retain a desirable amount of carbon in the metal.

I am aware that it has been proposed to partially desiliconize metal in a converter for foundry purposes; but that process is entirely different from my invention. For instance, if molten metal containing two per cent. of silicon and four per cent. of carbon is treated by my process, the resulting metal will contain but the two-hundredths of one per cent. of silicon and all or nearly all of its carbon, whereas, if the same quality of metal is treated in a Bessemer converter until the silicon is reduced to the same degree, a metal is produced containing a mere trace of carbon.

Having described my invention, what I claim, and desire to secure by Letters Patent, is—

1. The method of producing metal high in phosphorus and carbon and low in silicon, which consists in smelting iron ores in a blast-furnace with suitable charges of limestone and phosphuretic basic slag to flux the metal and charge it with phosphorus to the desired degree, and then treating the metal high in carbon, silicon, and phosphorus so produced in a silicious-lined open hearth furnace to reduce the silicon, whereby a metal high in carbon and phosphorus and low in silicon is produced, substantially as and for the purpose hereinbefore set forth.

2. The method of producing metal high in phosphorus and carbon and low in silicon, which consists in smelting iron ores with suitable charges of coke, limestone, and phosphuretic basic slag in a blast-furnace, and then running the molten metal into a silicious-lined open hearth and treating it therein until the metal begins to boil and the elimination of the carbon commences, whereby a metal high in phosphorus and carbon and practically free from silicon is produced, substantially as and for the purpose hereinbefore set forth.

3. As a new article of manufacture cast-iron or pig metal high in carbon and phosphorus and containing not more that one-half of one per cent. of silicon, substantially as herein specified.

In testimony whereof I have hereunto set my hand.

JACOB REESE.

Witnesses:
FRANK M. REESE,
JAMES H. PORTE.